US 6,704,756 B2

(12) United States Patent
Wollrath et al.

(10) Patent No.: US 6,704,756 B2
(45) Date of Patent: Mar. 9, 2004

(54) METHODS, APPARATUS, AND PRODUCT FOR DISTRIBUTED GARBAGE COLLECTION

(75) Inventors: Ann M. Wollrath, Groton, MA (US); James H. Waldo, Dracut, MA (US); Roger Riggs, Burlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 123 days.

(21) Appl. No.: 09/853,644

(22) Filed: May 14, 2001

(65) Prior Publication Data

US 2002/0002576 A1 Jan. 3, 2002

Related U.S. Application Data

(63) Continuation of application No. 09/152,062, filed on Sep. 11, 1998, now Pat. No. 6,314,435, which is a continuation of application No. 08/729,421, filed on Oct. 11, 1996, now Pat. No. 5,832,529.

(51) Int. Cl.$^7$ ............................................ G06F 17/30
(52) U.S. Cl. .................... 707/206; 707/10; 707/103 Y; 707/201; 709/201; 709/104
(58) Field of Search ................ 707/206, 10, 103 Y; 707/201; 709/104, 201; 711/167

(56) References Cited

U.S. PATENT DOCUMENTS

| 4,430,699 A | 2/1984 | Segarra et al. ............... 709/230 |
| 4,491,946 A | 1/1985 | Kryskow, Jr. et al. ...... 370/453 |
| 4,558,413 A | 12/1985 | Schmidt et al. ............. 707/203 |
| 4,567,359 A | 1/1986 | Lockwood ................... 235/381 |
| 4,713,806 A | 12/1987 | Oberlander et al. ........ 370/358 |
| 4,809,160 A | 2/1989 | Mahon et al. ............... 713/200 |
| 4,823,122 A | 4/1989 | Mann et al. ............ 340/825.28 |
| 4,939,638 A | 7/1990 | Stephenson et al. ........ 710/244 |
| 4,956,773 A | 9/1990 | Saito et al. .................. 717/104 |
| 4,992,940 A | 2/1991 | Dworkin ....................... 705/26 |

(List continued on next page.)

FOREIGN PATENT DOCUMENTS

| EP | 0 300 516 A2 | 1/1989 |
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |

(List continued on next page.)

OTHER PUBLICATIONS

Cary G. Gray and David R. Cheriton, "Leases: An Efficient Fault–Tolerant Mechanism for Distribution File Consistency", ACM, 1989, pp. 202–210.*

Andrew Birrell, Greg Nelson, Susan Owicki, and Edward Wobber, "Network Objects", ACM, 1993, pp. 217–230.*

Elliot Kolodner, Barabara Liskov, and William Weihl, "Atomic Garbage Collection: Managing a Stable Heap", ACM, 1989, pp. 15–25.*

(List continued on next page.)

Primary Examiner—John Breene
Assistant Examiner—Cheryl Lewis
(74) Attorney, Agent, or Firm—Finnegan, Henderson, Farabow, Garrett & Dunner, L.L.P.

(57) ABSTRACT

In accordance with the present invention a process is provided for allocating and deallocating resources in a distributed processing system having a requester platform and a server platform. The process involves receiving a request from the requester platform referring to a system resource and specifying a requested lease period, permitting shared access to the system resource for a lease period, sending a return call to the requester platform advising of the lease period, and deallocating the system resource when the lease period expires.

149 Claims, 8 Drawing Sheets

U.S. PATENT DOCUMENTS

| | | | |
|---|---|---|---|
| 5,088,036 A | 2/1992 | Ellis et al. | 707/206 |
| 5,109,486 A | 4/1992 | Seymour | 709/224 |
| 5,187,787 A | 2/1993 | Skeen et al. | 709/314 |
| 5,218,699 A | 6/1993 | Brandle et al. | 709/328 |
| 5,253,165 A | 10/1993 | Leiseca et al. | 705/5 |
| 5,257,369 A | 10/1993 | Skeen et al. | 709/312 |
| 5,293,614 A | 3/1994 | Ferguson et al. | 707/201 |
| 5,297,283 A | 3/1994 | Kelly, Jr. et al. | 709/104 |
| 5,307,490 A | 4/1994 | Davidson et al. | 709/328 |
| 5,311,591 A | 5/1994 | Fischer | 713/156 |
| 5,319,542 A | 6/1994 | King, Jr. et al. | 705/27 |
| 5,327,559 A | 7/1994 | Priven et al. | 709/101 |
| 5,339,435 A | 8/1994 | Lubkin et al. | 711/11 |
| 5,386,568 A | 1/1995 | Wold et al. | 717/10 |
| 5,390,328 A | 2/1995 | Frey et al. | 709/315 |
| 5,392,280 A | 2/1995 | Zheng | 370/353 |
| 5,423,042 A | 6/1995 | Jalili et al. | 709/328 |
| 5,440,744 A | 8/1995 | Jacobson et al. | 709/203 |
| 5,448,740 A | 9/1995 | Kiri et al. | 717/8 |
| 5,452,459 A | 9/1995 | Drury et al. | 707/3 |
| 5,455,952 A | 10/1995 | Gjovaag | 717/1 |
| 5,471,629 A | 11/1995 | Risch | 707/201 |
| 5,475,792 A | 12/1995 | Stanford et al. | 704/233 |
| 5,475,817 A | 12/1995 | Waldo et al. | 709/316 |
| 5,475,840 A | 12/1995 | Nelson et al. | 709/331 |
| 5,481,721 A | 1/1996 | Serlet et al. | 709/315 |
| 5,504,921 A | 4/1996 | Dev et al. | 709/223 |
| 5,511,196 A | 4/1996 | Shackelford et al. | 709/315 |
| 5,511,197 A | 4/1996 | Hill et al. | 709/328 |
| 5,524,244 A | 6/1996 | Robinson et al. | 717/5 |
| 5,544,040 A | 8/1996 | Gerbaulet | 705/26 |
| 5,548,726 A | 8/1996 | Pettus | 709/221 |
| 5,553,282 A | 9/1996 | Parrish et al. | 707/10 |
| 5,555,367 A | 9/1996 | Premerlani et al. | 707/4 |
| 5,555,427 A | 9/1996 | Aoe et al. | 709/201 |
| 5,557,798 A | 9/1996 | Skeen et al. | 705/35 |
| 5,560,003 A | 9/1996 | Nilsen et al. | 707/206 |
| 5,561,785 A | 10/1996 | Blandy et al. | 711/170 |
| 5,577,231 A | 11/1996 | Scalzi et al. | 703/26 |
| 5,592,375 A | 1/1997 | Salmon et al. | 705/7 |
| 5,594,921 A | 1/1997 | Pettus | 710/11 |
| 5,603,031 A | 2/1997 | White et al. | 709/317 |
| 5,617,537 A | 4/1997 | Yamada et al. | 709/214 |
| 5,628,005 A | 5/1997 | Hurvig | 707/8 |
| 5,640,564 A | 6/1997 | Hamilton et al. | 709/315 |
| 5,644,768 A | 7/1997 | Periwal et al. | 709/102 |
| 5,652,888 A | 7/1997 | Burgess | 709/318 |
| 5,655,148 A | 8/1997 | Richman et al. | 710/8 |
| 5,659,751 A | 8/1997 | Heninger | 709/332 |
| 5,664,110 A | 9/1997 | Green et al. | 705/26 |
| 5,664,111 A | 9/1997 | Nahan et al. | 705/27 |
| 5,666,493 A | 9/1997 | Wojcik et al. | 705/26 |
| 5,671,225 A | 9/1997 | Hooper et al. | 370/468 |
| 5,671,279 A | 9/1997 | Elgamal | 705/79 |
| 5,675,796 A | 10/1997 | Hodges et al. | 709/100 |
| 5,675,797 A | 10/1997 | Chung et al. | 709/104 |
| 5,680,573 A | 10/1997 | Rubin et al. | 711/129 |
| 5,680,617 A | 10/1997 | Gough et al. | 707/104.1 |
| 5,684,955 A | 11/1997 | Meyer et al. | 709/316 |
| 5,689,709 A | 11/1997 | Corbett et al. | 709/315 |
| 5,694,551 A | 12/1997 | Doyle et al. | 705/26 |
| 5,706,435 A | 1/1998 | Barbara et al. | 711/141 |
| 5,706,502 A | 1/1998 | Foley et al. | 707/10 |
| 5,710,887 A | 1/1998 | Chelliah et al. | 705/26 |
| 5,715,314 A | 2/1998 | Payne et al. | 705/78 |
| 5,721,832 A | 2/1998 | Westrope et al. | 705/27 |
| 5,724,540 A * | 3/1998 | Kametani | 711/220 |
| 5,724,588 A | 3/1998 | Hill et al. | 709/328 |
| 5,727,048 A | 3/1998 | Hiroshima et al. | 379/93.12 |
| 5,727,145 A | 3/1998 | Nessett et al. | 713/200 |
| 5,729,594 A | 3/1998 | Klingman | 379/93.12 |
| 5,737,607 A | 4/1998 | Hamilton et al. | 717/1 |
| 5,742,768 A | 4/1998 | Gennaro et al. | 1/1 |
| 5,745,678 A | 4/1998 | Herzberg et al. | 713/200 |
| 5,745,695 A | 4/1998 | Gilchrist et al. | 709/227 |
| 5,745,703 A | 4/1998 | Cejtin et al. | 709/238 |
| 5,745,755 A | 4/1998 | Covey | 707/203 |
| 5,748,897 A | 5/1998 | Katiyar | 709/219 |
| 5,754,849 A | 5/1998 | Dyer et al. | 707/101 |
| 5,757,925 A | 5/1998 | Faybishenko | 709/203 |
| 5,758,328 A | 5/1998 | Giovannoli | 705/26 |
| 5,758,344 A | 5/1998 | Prasad et al. | 707/10 |
| 5,761,656 A | 6/1998 | Ben-Shachar | 707/4 |
| 5,764,897 A | 6/1998 | Khalidi | 709/201 |
| 5,768,532 A | 6/1998 | Megerian | 709/245 |
| 5,774,551 A | 6/1998 | Wu et al. | 713/155 |
| 5,774,729 A | 6/1998 | Carney et al. | 717/126 |
| 5,778,179 A | 7/1998 | Kanai et al. | 709/203 |
| 5,778,187 A | 7/1998 | Monteiro et al. | 709/231 |
| 5,778,228 A | 7/1998 | Wei | 709/328 |
| 5,778,368 A | 7/1998 | Hogan et al. | 707/10 |
| 5,784,560 A | 7/1998 | Kingdon et al. | 709/201 |
| 5,787,425 A | 7/1998 | Bigus | 707/6 |
| 5,787,431 A | 7/1998 | Shaughnessy | 707/100 |
| 5,790,548 A | 8/1998 | Sistanizadeh et al. | 370/401 |
| 5,790,677 A | 8/1998 | Fox et al. | 705/78 |
| 5,794,207 A | 8/1998 | Walker et al. | 705/1 |
| 5,802,367 A | 9/1998 | Held et al. | 709/332 |
| 5,805,805 A | 9/1998 | Civanlar et al. | 709/220 |
| 5,808,911 A | 9/1998 | Tucker et al. | 709/316 |
| 5,809,144 A | 9/1998 | Sirbu et al. | 705/53 |
| 5,809,507 A | 9/1998 | Cavanaugh, III | 707/103 |
| 5,812,819 A | 9/1998 | Rodwin et al. | 703/23 |
| 5,813,013 A | 9/1998 | Shakib et al. | 707/102 |
| 5,815,149 A | 9/1998 | Mutschler, III et al. | 345/762 |
| 5,815,709 A | 9/1998 | Waldo et al. | 712/300 |
| 5,815,711 A | 9/1998 | Sakamoto et al. | 717/1 |
| 5,818,448 A | 10/1998 | Katiyar | 709/203 |
| 5,829,022 A | 10/1998 | Watanabe et al. | 711/118 |
| 5,832,219 A | 11/1998 | Pettus | 709/203 |
| 5,832,529 A | 11/1998 | Wollrath et al. | 707/206 |
| 5,832,593 A | 11/1998 | Wurst et al. | 29/750 |
| 5,835,737 A | 11/1998 | Sand et al. | 710/113 |
| 5,842,018 A | 11/1998 | Atkinson et al. | 707/501 |
| 5,844,553 A | 12/1998 | Hao et al. | 345/329 |
| 5,845,090 A | 12/1998 | Collins, III et al. | 709/221 |
| 5,845,129 A | 12/1998 | Wendorf et al. | 710/200 |
| 5,850,442 A | 12/1998 | Muftic | 705/65 |
| 5,860,004 A | 1/1999 | Fowlow et al. | 717/1 |
| 5,860,153 A | 1/1999 | Matena et al. | 711/216 |
| 5,864,862 A | 1/1999 | Kriens et al. | 707/103 R |
| 5,864,866 A | 1/1999 | Henckel et al. | 707/103 R |
| 5,872,928 A | 2/1999 | Lewis et al. | 709/222 |
| 5,872,973 A | 2/1999 | Mitchell et al. | 709/332 |
| 5,875,335 A | 2/1999 | Beard | 717/5 |
| 5,878,411 A | 3/1999 | Burroughs et al. | 707/4 |
| 5,884,024 A | 3/1999 | Lim et al. | 713/201 |
| 5,884,079 A | 3/1999 | Furusawa | 717/109 |
| 5,887,134 A | 3/1999 | Ebrahim | 709/200 |
| 5,889,951 A | 3/1999 | Lombardi | 709/219 |
| 5,890,158 A | 3/1999 | House et al. | 707/10 |
| 5,892,904 A | 4/1999 | Atkinson et al. | 713/201 |
| 5,913,029 A | 6/1999 | Shostak | 709/203 |
| 5,933,497 A | 8/1999 | Beetcher et al. | 705/59 |
| 5,933,647 A | 8/1999 | Aronberg et al. | 717/178 |
| 5,935,249 A | 8/1999 | Stern et al. | 713/201 |
| 5,940,827 A | 8/1999 | Hapner et al. | 707/8 |
| 5,944,793 A | 8/1999 | Islam et al. | 709/220 |
| 5,946,485 A | 8/1999 | Weeren et al. | 717/3 |
| 5,946,694 A | 8/1999 | Copeland et al. | 707/103 R |
| 5,949,998 A | 9/1999 | Fowlow et al. | 717/105 |

| | | | |
|---|---|---|---|
| 5,951,652 A | 9/1999 | Ingrassia, Jr. et al. | 709/248 |
| 5,956,509 A | 9/1999 | Kevner | 709/330 |
| 5,963,924 A | 10/1999 | Williams et al. | 705/40 |
| 5,963,947 A | 10/1999 | Ford et al. | 707/10 |
| 5,966,531 A | 10/1999 | Skeen et al. | 709/315 |
| 5,969,967 A | 10/1999 | Aahlad et al. | 700/2 |
| 5,974,201 A | 10/1999 | Chang et al. | 382/305 |
| 5,978,484 A | 11/1999 | Apperson et al. | 705/54 |
| 5,982,773 A | 11/1999 | Nishimura et al. | 370/395.53 |
| 5,987,506 A | 11/1999 | Carter et al. | 709/213 |
| 5,999,179 A | 12/1999 | Kekic et al. | 345/734 |
| 5,999,988 A | 12/1999 | Pelegri-Llopart et al. | 709/330 |
| 6,003,050 A | 12/1999 | Silver et al. | 717/536 |
| 6,003,763 A | 12/1999 | Gallagher et al. | 235/379 |
| 6,009,103 A | 12/1999 | Woundy | 370/401 |
| 6,009,413 A | 12/1999 | Webber et al. | 705/26 |
| 6,016,496 A | 1/2000 | Roberson | 707/103 R |
| 6,016,516 A | 1/2000 | Horikiri | 709/330 |
| 6,023,586 A | 2/2000 | Gaisford et al. | 717/178 |
| 6,026,414 A | 2/2000 | Anglin | 707/204 |
| 6,031,977 A | 2/2000 | Pettus | 709/230 |
| 6,032,151 A | 2/2000 | Arnold et al. | 707/103 R |
| 6,044,381 A | 3/2000 | Boothby et al. | 707/201 |
| 6,052,761 A | 4/2000 | Hornung et al. | 711/141 |
| 6,058,383 A | 5/2000 | Narasimhalu et al. | 705/44 |
| 6,061,699 A | 5/2000 | DiCecco et al. | 707/513 |
| 6,061,713 A | 5/2000 | Bharadhwaj | 709/203 |
| 6,067,575 A | 5/2000 | McManis et al. | 709/313 |
| 6,085,255 A | 7/2000 | Vincent et al. | 709/238 |
| 6,093,216 A | 7/2000 | Adl-Tabatabai et al. | 717/128 |
| 6,108,346 A | 8/2000 | Doucette et al. | 370/450 |
| 6,134,603 A | 10/2000 | Jones et al. | 709/330 |
| 6,182,083 B1 | 1/2001 | Scheifler et al. | 707/103 R |
| 6,185,602 B1 | 2/2001 | Bayrakeri | 709/204 |
| 6,185,611 B1 | 2/2001 | Waldo et al. | 709/221 |
| 6,199,116 B1 | 3/2001 | May et al. | 709/310 |
| 6,216,138 B1 | 4/2001 | Wells et al. | 707/502 |
| 6,216,158 B1 | 4/2001 | Luo et al. | 709/217 |
| 6,226,746 B1 | 5/2001 | Scheifler | 713/200 |
| 6,243,716 B1 | 6/2001 | Waldo et al. | 707/202 |
| 6,247,091 B1 | 6/2001 | Lovett | 710/260 |
| 6,253,256 B1 | 6/2001 | Wollrath et al. | 709/330 |
| 6,263,350 B1 | 7/2001 | Wollrath et al. | 707/206 |
| 6,263,379 B1 | 7/2001 | Atkinson et al. | 709/332 |
| 6,272,559 B1 | 8/2001 | Jones et al. | 709/330 |
| 6,282,295 B1 | 8/2001 | Young et al. | 380/286 |
| 6,282,568 B1 | 8/2001 | Sondur et al. | 709/223 |
| 6,339,783 B1 | 1/2002 | Horikiri | 709/203 |
| 6,343,308 B1 | 1/2002 | Marchesseault | 709/1 |

FOREIGN PATENT DOCUMENTS

| | | |
|---|---|---|
| EP | 0 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

"Java (TM) Remote Method Invocation Specification," Sun Microsystems, Inc., <java.sun.com/products/jdk1.2beta1>, 1997.

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Alexander et al., "Active Bridging," Proceedings of the ACM/SIGCOMM'97 Conference, Cannes, France, Sep., 1997.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems Research Center, No. 116, pp. 1–18, Dec. 15, 1993.

Birrell et al., "Grapevine: An Exercise in Distributed Computing," Communications of the ACM, vol. 25, No. 4, pp. 260–274, Apr. 1982.

Birrell et al., "Implementing Remote Procedure Calls," ACM Transactions on Computer Systems, vol. 2, No. 1, pp. 36–59, Feb. 1984.

Birrell et al., "Network Objects," DEC SRC Research Report 115, Feb. 28, 1994.

Birrell et al., "Network Objects," Operating Systems Review, 27(5), pp. 217–230, Dec. 1993.

Burns et al., "An Analytical Study of Opportunistic Lease Renewal," Distributed Computing Systems, 21st International Conference, pp. 146–153, Apr. 2000.

Cannon et al., "Adding Fault–Tolerant Transaction Processing to Linda," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed Data Structures in Linda," Principles of Programming Language, pp. 1–16, 1996.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publications, Inc., Sep. 1978.

Chung et al., "A 'Tiny' Pascal Compiler: Part 2: The P–Compiler," BYTE Publications, Inc., Oct. 1978.

Coulouris et al., "Distributed Systems Concepts and Designs," Second Ediition, Addison–Wesley, 1994.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–48, Oct. 1, 1991.

Dijkstra, "Self–stabilizing Systems in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dollimore et al., "The Design of a System for Distributing Shared Objects," The Computer Journal, No. 6, Cambridge, GB, Dec. 1991.

Dourish, "A Divergence–Based Model of Synchrony and Distribution in Collaborative Systems," Xerox Technical Report EPC–1194–102, pp. 1–10, 1994.

Drexler et al., "Incentive Engineering for Computational Resource Management," The Ecology of Computation, Elsevier Science Publishers B.V., pp. 231–66, 1988.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gelernter et al., "Parallel Programming in Linda," Yale University, pp. 1–21, Jan. 1985.

Gelernter, "Generative Communication in Linda," ACM Transactions on Programming Languages and Systems, vol. 7, No. 1, pp. 80–112, Jan. 1985.

Gosling et al., "The Java (TM) Language Specification," Addison–Wesley, 1996.

Gottlob et al., "Extending Object–Oriented Systems with Roles," ACM Transactions On Information Systems, vol. 14, No. 3, pp. 268–296, Jul. 1996.

Gray et al., "Leases: An Efficient Fault–Tolerant Mechanism for Distributed File Cache Consistency," Proceedings of the 12th ACM Symposium on Operating Systems Principles, pp. 202–210, 1989.

Guth, "JavaOne: Sun to Expand Java Distributed Computing Effort," <http://www.sunworld.com/swol–02–1998/swol–02–sunspots.html>, XP–002109935, P.1 , Feb. 20, 1998.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hamilton et al., "Subcontract: A Flexible Base For Distributed Programming," Proceedings of 14th Symposium of Operating System Principles, Dec. 1993.

Hamilton, "Java and the Shift to Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96–11, Department of Comp. Sci., Univ. of Arizona, Jun. 1996.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

Howard et al., "Scale and Performance in a Distributed File System," ACM Transactions on Computer Systems, vol. 6, No. 1, pp. 51–81, Feb. 1988.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM Technical Disclosure Bulletin, "Local Network Monitoring to Populate Access Agent Directory," vol. 36, No. 09A, pp. 403–405, Sep. 1993.

IBM, "Chapter 6—Distributed SOM (DSOM)," SOMobjects Developer Toolkit Users Guide, Version 2.1, pp. 6–1–6–90, Oct. 1994.

Jaworski, "Java 1.1 Developer's Guide, 2nd Edition," Sams.net, 1997.

Jones et al., "Garbage Collection: Algorithms for Automatic Dynamic Memory Management," pp. 165–175, John Wiley & Sons, 1996.

Kambhatla et al., "Recovery with Limited Replay: Fault–Tolerant Processes in Linda," Oregon Graduate Institute, Technical Report CSIE 90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

Linda Database Search, pp. 1–68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Mitchell et al., "An Overview of the Spring System," Feb. 1994.

Mitchell et al., "Mesa Language Manual," Xerox Corporation, Palo Alto Research Center, 1978.

Mullender, "Distributed Systems," Second Edition, Addison–Wesley, 1993.

Mummert et al., "Long Term Distributed File Reference Tracing: Implementation and Experience," Carneigie Mellon University School of Computer Science, pp. 1–28, Nov. 1994.

MUX–Elektronik, Java 1.1 Interactive Course, www.lls.se/~mux/javaic.html, 1995.

Orfali et al., "The Essential Distributed Objects Survival Guide," Chapter 11: Corba Commerical ORBs, pp. 203–215, John Wiley & Sons, Inc., 1996.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Riggs et al., "Pickling State in the Java (TM) System," USENIX Assocation Conference on Object–Oriented Technologies and Systems, XP–002112719, pp. 241–250, Jun. 17–21, 1996.

Rosenberry et al., "Understanding DCE," Chapters 1–3, 6, 1992.

Sharrott et al., "ObjectMap: Integrating High Performance Resources into a Distributed Object–oriented Environment," ICODP, 1995.

Stevenson, "Token–Based Consistency of Replicated Servers," IEEE, CH2686–4/89/0000/0179, pp. 179–183, 1989.

Thompson, "Regular Expression Search Algorithm," Communications of the ACM, vol. II, No. 6, p. 149 et seq., Jun. 1968.

Venners, "Jini Technology, Out of the Box," JAVAWORLD, 'Online!, pp. 1–4, Dec. 1998.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wollrath et al., "A Distributed Object Model for the Java (TM) System," USENIX Association, Conference on Object–Oriented Technologies and Systems, Jun. 17–21. 1996.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

"Consumers Can View, Share Picture On–Line as Kodak Picture Network Goes 'Live', " Business Wire, Aug. 25, 1997, pp. 18–19.

"ISN Dataweb Sells Software, Hardware, " Datamation, Apr. 1, 1996, p. 40.

"Kodak DC220 and DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Boardwatch Magazine, Jan. 1995. pg.1.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", Retailtech, The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Keller, "Smart Catalogs and Virtual Catalogs," Proceedings of the First USENIX Workshop of Electronic Commerce, USENIX Association, Jul. 11–12, 1995, pp. 125–131.

Klein et al., "Trade'ex: The Stock Exchange of the Computer Industry," Harvard Business School Publishing, 1996, pp. 1–14.

Kodak Photonet FAQ, PhotoNet Online, Jun. 14, 2002, pp. 1–3.

Kramer, "Netwatch; The AJC's Daily Online Guide; Get the picture: Kodak will send photos to Web," The Atlanta Journal and Constitution, Sec. Features, pg. 08C, Jun. 5, 1997.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing; Launches PhotoNet online digital photography and imaging services," Photographic Trade News, Sec. pp. 23, Jan. 1997.

Miller, "Web posting as a photo processing option," USA Today, Section: Life, pg. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your future?," Database Searcher, vol. 5, No. 6, pg. 18., 1983.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mall'," Tech. Section at B5, Nov. 27, 1995.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening Internet market, secure systems and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishng, 1996.

"Eden Project Proposal," Department of Computer Science, University of Washington, Oct. 1980, Technical Report #80–10–01, cover and Foreword.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Ciancarini et al., "Coordinating Distributed Applets with Shade/Java," Feb./1998, pp. 130–138.

Delcambre et al., "Simulation of the Object Flow Model: A Conceptual Modeling Language for Object–Driven Applications," 1993, pp. 216–225.

Goldberg et al., "Smalltalk–80—The Language and its Implementation," Xerox Palo Alto Research Center, 1983 (reprinted with corrections, Jul. 1985), pp. 1–720.

Hodges, Douglas, "Managing Object Lifetimes in OLE," Aug. 25, 1994, pp. 1–41.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Procedure Calls," University of Washington, Thesis, Mar. 22, 1985, pp. 1–106.

Hutchinson, "Emerald: An Object–Based Language for Distributed Programming," a Dissertation, University of Washington, 1987, pp. 1–107.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented Sysem," a Dissertation, University of Washington, 1989, pp. 1–154 (1 page Vita).

Koshizuka et al., "Window Real–Objects: A Distributed Shared Memory for Distributed Implementation of GUI Applications," Nov. 1993, pp. 237–247.

Krasner et al., "Smalltalk–80: Bits of History, Words of Advice," 1983, Xerox Corporation, pp. 1–344.

Lavana et al., "Executable Workflows: A Paradigm for Collaborative Design on the Internet," Jun./1997, 6 pages.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture," 1993, pp. 1–8.

Droms, R., "Dynamic Host Configuration Protocol," Oct. 1993, pp. 1–37.

Osborn, "The Role of Polymophism in Schema Evolution in an Object–Oriented Database," IEEE Transactions on Knowledge and Data Engineering, vol. 1, No. 3, Sep. 1989, pp. 310–317.

Kon, Fabio "Distributed File Systems Past, Present and Future A distributed File system for 2006," Mar. 6, 1996, pp. 1–12.

* cited by examiner

METHODS, APPARATUS, AND PRODUCT FOR DISTRIBUTED GARBAGE COLLECTION

This is a continuation of application Ser. No. 09/152,062, U.S. Pat. No. 6,314,435, filed Sep. 11, 1998, which is a continuation of application Ser. No. 08/729,421, filed Oct. 11, 1996, now U.S. Pat. No. 5,832,529, all of which are incorporated herein by reference.

BACKGROUND OF THE INVENTION

A. Field of the Invention

This invention generally relates to garbage collection for computer systems and, more particularly, to a fault-tolerant distributed garbage collection method for collecting resources bound to or associated with references.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection." That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource, and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back." According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period both can know when the lease and therefore, the guarantee, expires. This guarantees referential integrity for the duration of a reference lease and avoids the concern of failing to free the resource because of network errors.

In accordance with the present invention, as embodied and broadly described herein, a method for managing resources comprises the steps of receiving a request from a process referring to a resource and specifying a requested lease period, permitting shared access to the resource for a granted lease period, advising the process of the granted lease period, and deallocating the resource when the granted lease period expires. In accordance with another aspect of the present invention, as embodied and broadly described herein, a method for managing resources comprises the steps of requesting from a process access to a resource for a lease period, receiving from the process a granted lease period during which shared access to the resource is permitted, and sending a request to the process for a new lease period upon a determination that the granted lease period is about to expire but access to the resource has not completed.

In accordance with the present invention, as embodied and broadly described herein, an apparatus comprises a receiving module configured to receive a request from a process referring to a resource and specifying a requested lease period, a resource allocator configured to permit shared access to the resource for a granted lease period, an advising module configured to advise the process of the granted lease period, and a resource deallocator configured to deallocate the resource when the granted lease period expires. In accordance with another aspect of the present invention, as embodied and broadly described herein, an apparatus comprises a requesting module configured to request from a process access to a resource for a lease period a receiving module configured to receive from the process a granted lease period during which shared access to the resource is permitted, and a second sending module configured to send another request to the process for a new lease period upon a determination that the granted lease period is about to expire but access to the resource has not completed.

In accordance with yet another aspect of the present invention, as embodied and broadly described herein, a computer program product comprises a computer usable medium having computable readable code embodied therein for managing resources. The code comprises a receiving module configured to receive a request from a process referring to a resource and specifying a requested lease period, a resource allocator configured to permit shared access to the resource for a granted lease period, an advising module configured to advise of the granted lease period, and a resource deallocator configured to deallocate the resource when the granted lease period expires. In accordance with another aspect of the present invention, as embodied and broadly described herein, a computer program product comprises a computer usable medium having computable readable code embodied therein for managing resources. The code comprises a requesting module configured to request from a process access to a resource for a lease period, a receiving module configured to receive from the process a granted lease period during which the process permits shared access to the resource and a sending module configured to send another request to the process for a new lease period upon a determination that the granted lease period is about to expire.

BRIEF DESCRIPTION OF THE DRAWINGS

The accompanying drawings, which are incorporated in and constitute a part of this specification, illustrate an embodiment of the invention and, together with the description serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the JAVA™ programming language.

In general, whenever an application in the distributed processing system obtains a reference to a distributed resource, by a name lookup, as a return value to some other call, or another method, and seeks to access the resource, the application makes a call to the resource or to an MI component managing the resource. That MI component, called a managing MI component, keeps track of the number of outstanding references to the resource. When the number of references to a reference is zero the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
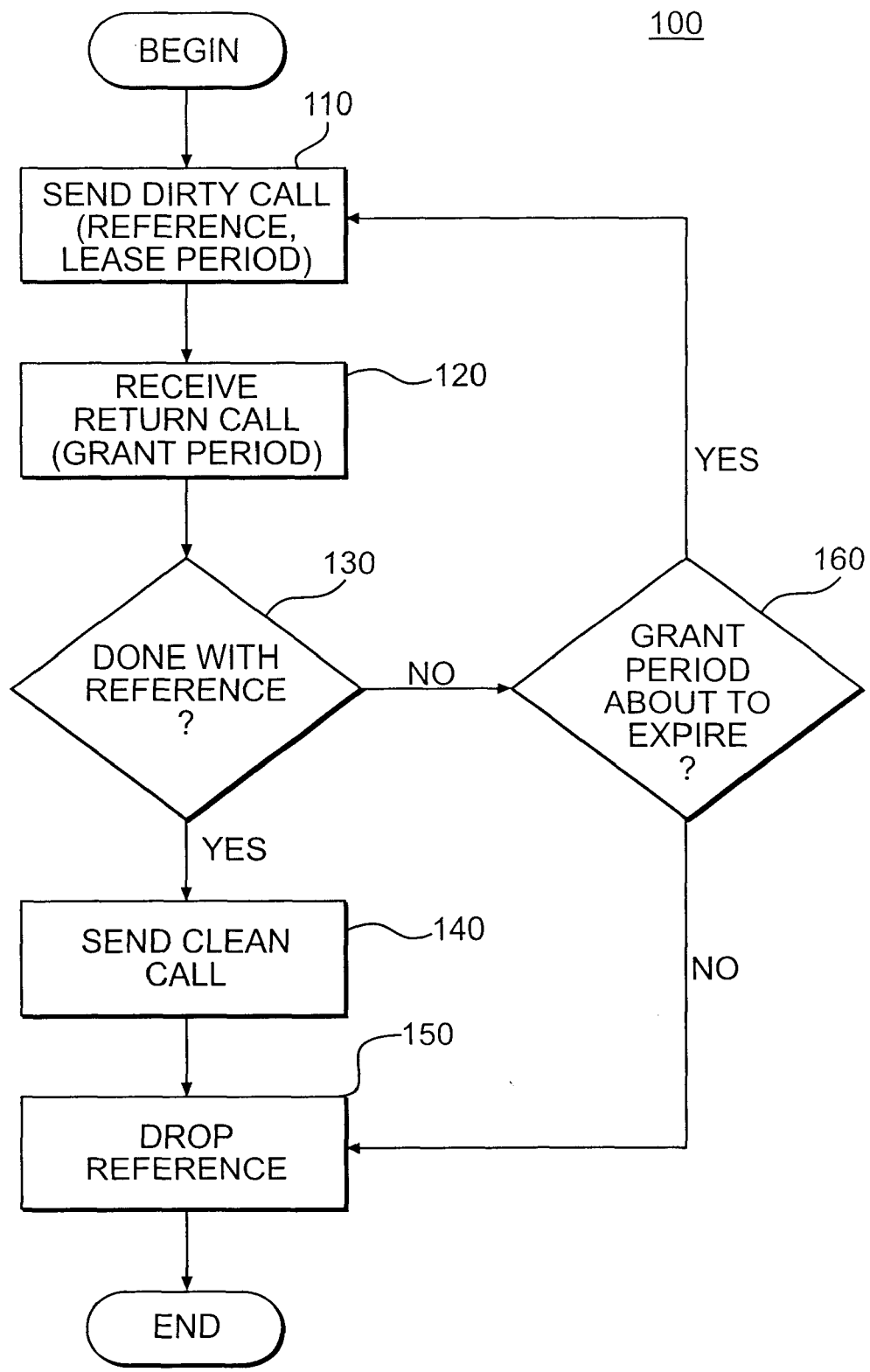
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 110 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(i) Dirt Calls

Figure 2:
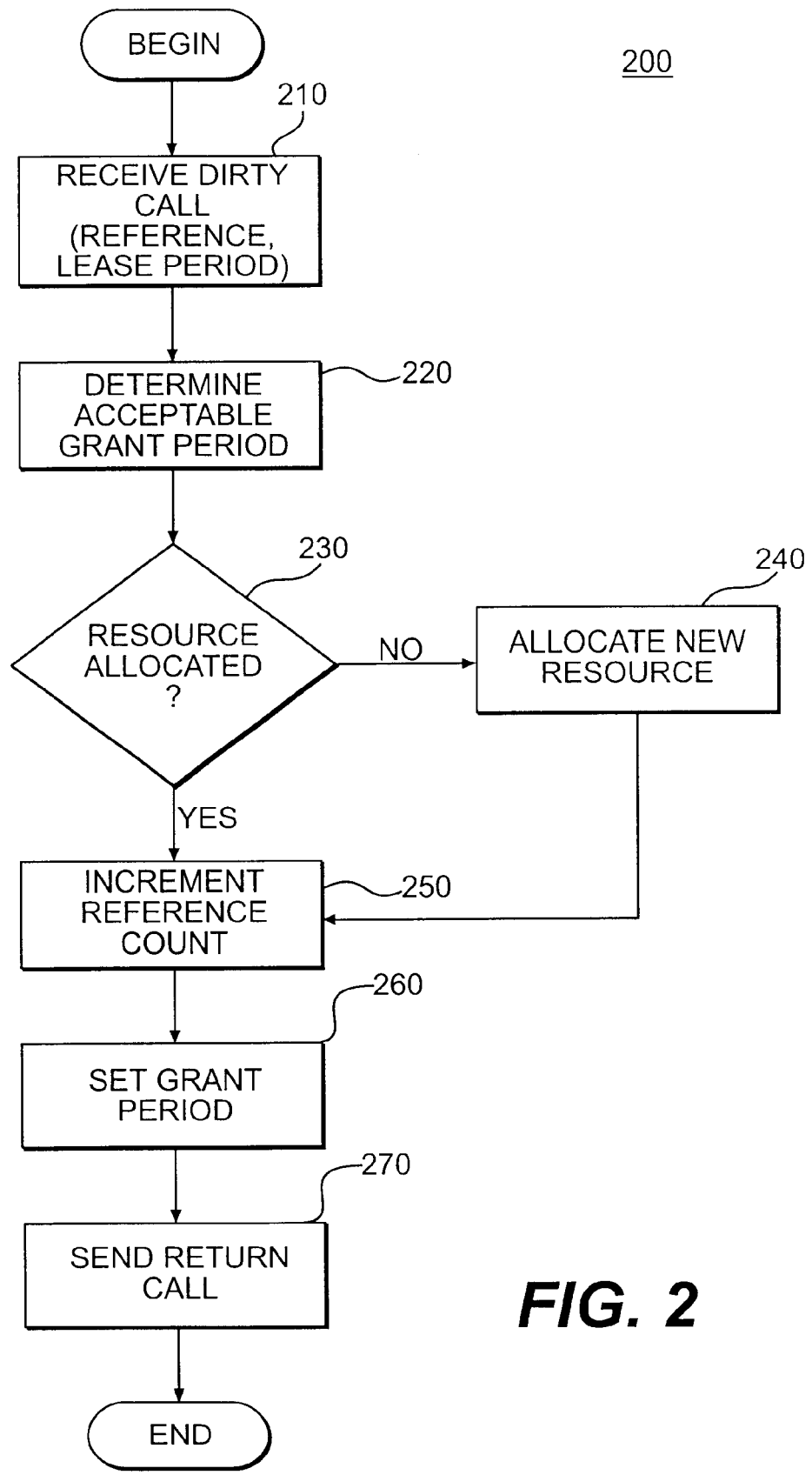
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system including the application call processor of the same MI component as the server call processor handling requests.

First the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
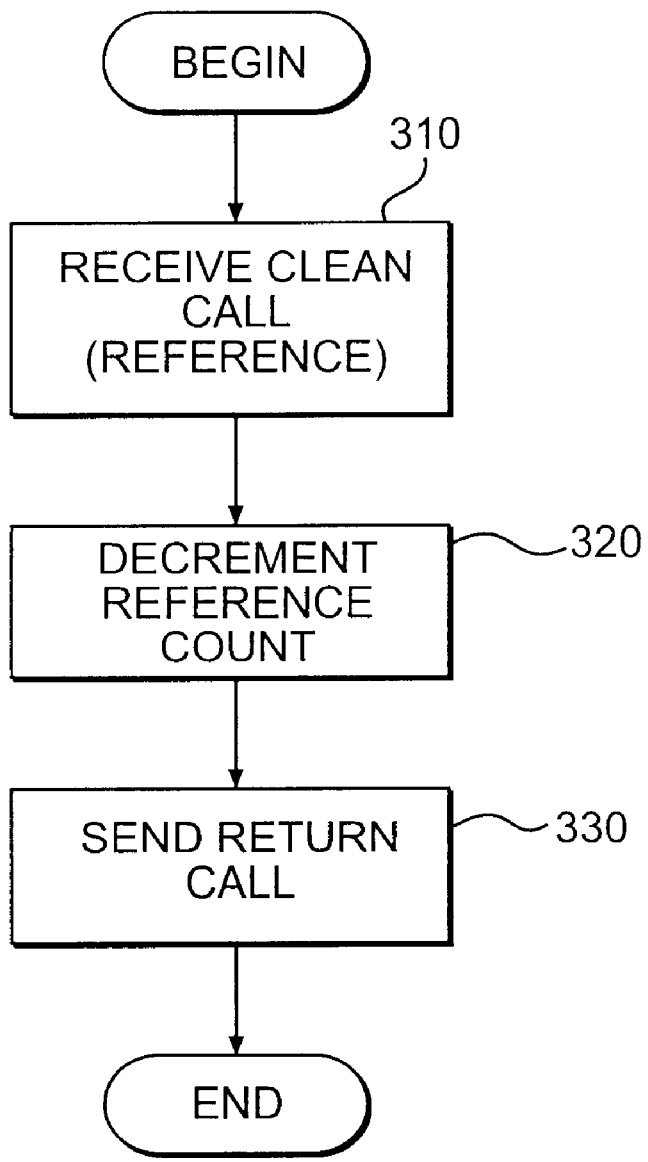
FIG. 3 is a flow diagram of the steps performed by the server call processor to process clean calls according to the implementation of the present invention.
Figure 4:
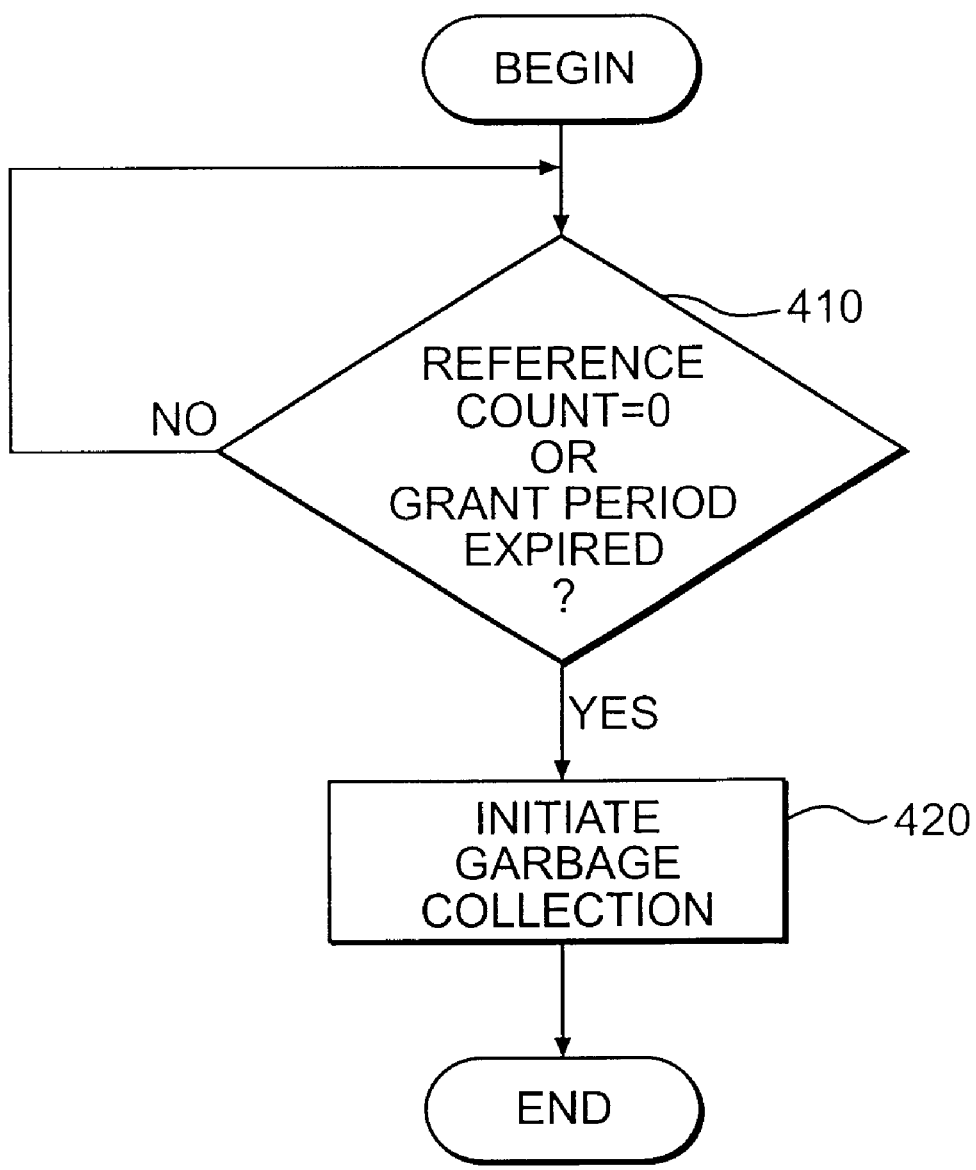
FIG. 4 is a flow diagram of the steps performed by the server call processor to initiate a garbage collection process according to the implementation of the present invention.

The MI component's server call processor also handles incoming clean calls from application call processors. When an application in the distributed processing system no longer requires a reference to a resource, it informs the MI component managing the resource for that reference so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

The server call processor monitors reference counts and granted lease periods and determines whether a reference count is zero for a resource managed by the MI component or the grant period for a reference has expired (step 410). When either condition exists, the server call processor initiates garbage collection (step 420) of that resource. Otherwise the server call processor continues monitoring the reference counts and granted lease periods.

C. Call Flow

Figure 5:
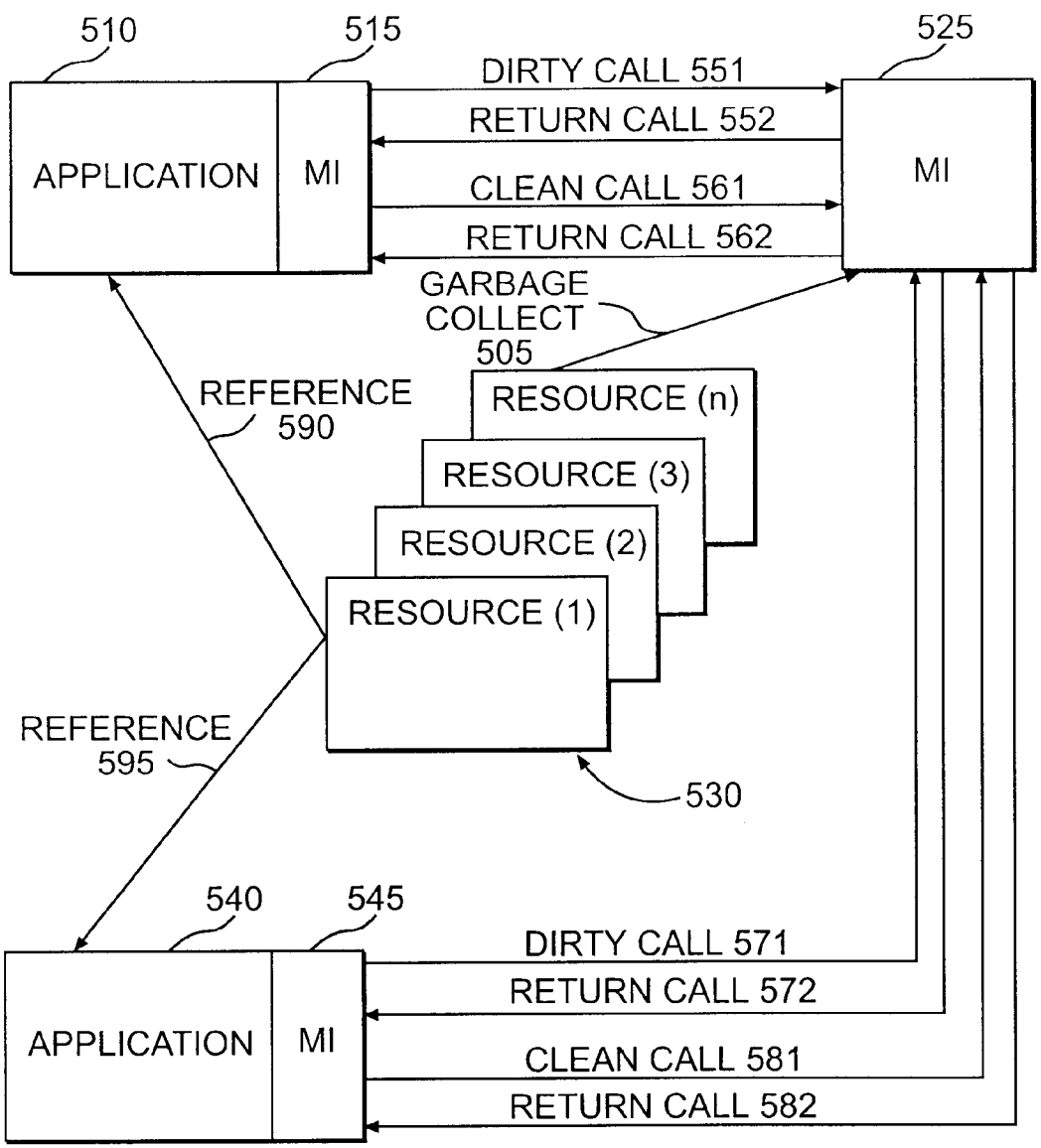
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571 managing MI component 525 sends return calls 552 and 572, respectively, to each of the MI components 515 and 545 respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing MI component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired, whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
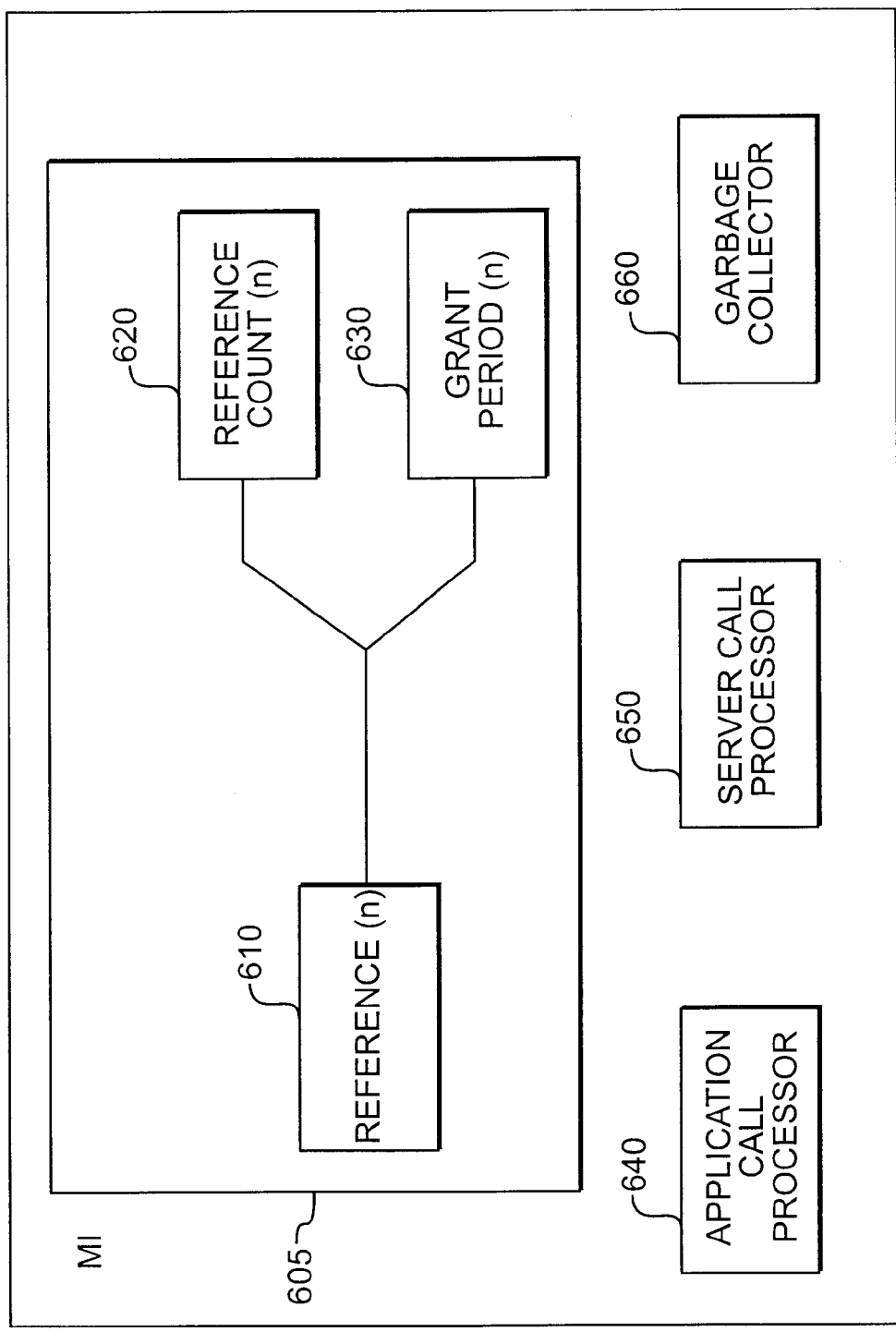
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
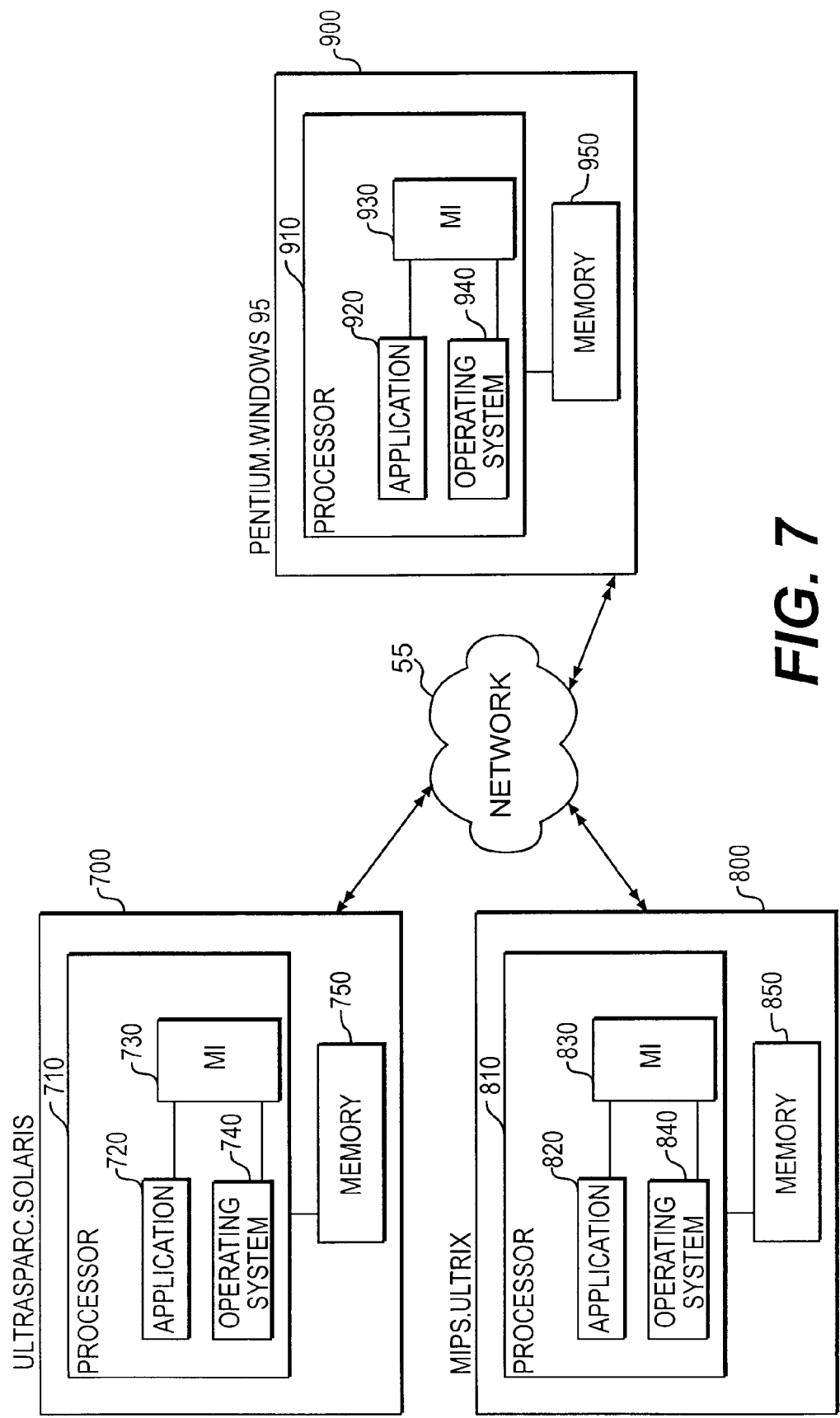
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930, respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910 respectively. The platforms 700. 800, and 900 can be heterogenous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
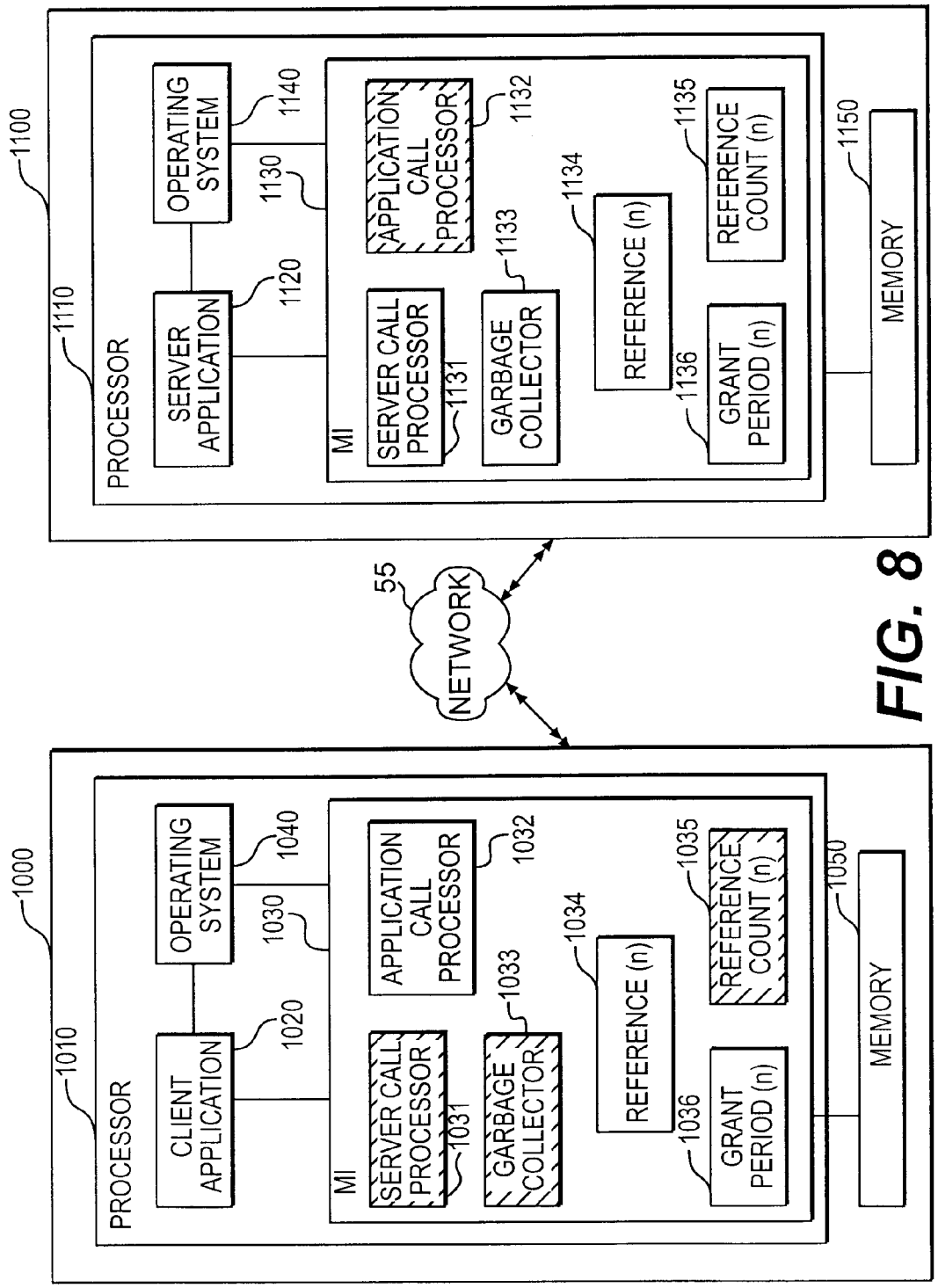
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example, processor 1010 executes a client application 1020 and processor 1110 executes a server application 1120. Processors 1010 and 1110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133, respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 1130 to send dirty calls. which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for managing objects distributed among a plurality of platforms within a distributed processing system, the method comprising:
   sending, from a first platform to a second platform remotely located from the first platform, a first request to access an object managed by the second platform, wherein the request indicates a period of time the first platform requests access to the object;
   sending, from the second platform to the first platform, a lease indicating a period of time for which access to the object is permitted by the first platform; and
   sending, by the first platform to the second platform, a second request to renew the lease, wherein the second request includes an indication of an additional period of time the first platform requests access to the object and wherein the additional period of time includes a time factor associated with a transmission time for the second request to be received by the second platform.

2. The method of claim 1, wherein sending the lease from the second platform to the first platform includes:
   incrementing a count corresponding to the object.

3. The method of claim 2, further including:
   collecting resources corresponding to the object when the second platform determines that the access period for the object indicated in the lease has expired or the count corresponding to the object indicates that access to the object is no longer requested.

4. The method of claim 2, further including:
   sending, from the first platform to the second platform, a notification indicating that access to the object is no longer needed; and
   decrementing, by the second platform, the count corresponding to the object.

5. A method for managing resources distributed among a plurality of platforms within a distributed processing system, the method performed by a first platform comprising:
   sending to a second platform a first dirty call associated with a resource managed by the second platform and including a requested lease period;
   receiving a return call including a granted lease period during which access to the resource is permitted by the first platform;
   determining a transmission time for the dirty call to be received by the second platform;
   determining that the lease period is about to expire;
   generating a second dirty call associated with the resource managed by the second platform and including a new requested lease period, wherein the new requested lease period includes a time factor associated with the transmission time; and
   sending the second dirty call to the second platform.

6. The method of claim 5, further including:
   determining that access to the resource is no longer needed; and
   sending to the second platform a notification indicating that access to the resource managed by the second platform is no longer needed.

7. A method for managing resources within a distributed processing system including a first platform and a second platform, the method performed by the second platform comprising:
   receiving a first dirty call from the first platform associated with a resource managed by the second platform and including a requested lease period;
   sending a first return call to the first platform including a granted lease period during which access to the resource is permitted by the first platform;
   receiving a second dirty call from the first platform associated with the resource managed by the second platform and including a new requested lease period, wherein the new requested lease period includes a time factor associated with a transmission time for the second dirty call to be received by the second platform; and
   sending a second return call to the first platform including a second granted lease period during which additional access to the resource is permitted by the first platform.

8. The method of claim 7, wherein sending the first return call includes:
   incrementing a count corresponding to the resource.

9. The method of claim 8, further including:
   collecting the resource when the second platform determines that the granted lease period for the resource has expired or the count corresponding to the resource indicates that access to the resource is no longer requested.

10. The method of claim 8, further including:

receiving a notification from the first platform indicating that access to the resource is no longer needed; and decrementing the count corresponding to the resource.

11. A computer-readable medium including instructions for performing a method when executed by a processor, for managing objects distributed among a plurality of platforms within a distributed processing system, the method comprising:

sending, from a first platform to a second platform remotely located from the first platform, a first request to access an object managed by the second platform, wherein the request indicates a period of time the first platform requests access to the object;

sending, from the second platform to the first platform, a lease indicating a period of time for which access to the object is permitted by the first platform; and sending, by the first platform to the second platform, a second request to renew the lease, wherein the second request includes an indication of an additional period of time the first platform requests access to the object and wherein the additional period of time includes a time factor associated with a transmission time for the second request to be received by the second platform.

12. The computer-readable medium of claim 11, wherein sending the lease from the second platform to the first platform includes:

incrementing a count corresponding to the object.

13. The computer-readable medium of claim 12, further including:

collecting resources corresponding to the object when the second platform determines that the access period for the object indicated in the lease has expired or the count corresponding to the object indicates that access to the object is no longer requested.

14. The computer-readable medium of claim 12, further including:

sending, from the first platform to the second platform, a notification indicating that access to the object is no longer needed; and decrementing, by the second platform, the count corresponding to the object.

15. A computer-readable medium including instructions for performing a method, when executed by a processor, for managing resources distributed among a plurality of platforms within a distributed processing system, the method performed by a first platform comprising:

sending to a second platform a first dirty call associated with a resource managed by the second platform and including a requested lease period;

receiving a return call including a granted lease period during which access to the resource is permitted by the first platform;

determining a transmission time for the dirty call to be received at the second platform;

determining that the lease period is about to expire;

generating a second dirty call associated with the resource managed by the second platform and including a new requested lease period, wherein the new requested lease period includes a time factor associated with the transmission time;

sending the second dirty call to the second platform.

16. The computer-readable medium of claim 15, further including:

determining that access to the resource is no longer needed; and sending to the second platform a notification indicating that access to the resource managed by the second platform is no longer needed.

17. A computer-readable medium including instructions for performing a method, when executed by a processor, for managing resources within a distributed processing system including a first platform and a second platform, the method performed by the second platform comprising:

receiving a first dirty call from the first platform associated with a resource managed by the second platform and including a requested lease period;

sending a first return call to the first platform including a granted lease period during which access to the resource is permitted by the first platform;

receiving a second dirty call from the first platform associated with the resource managed by the second platform and including a new requested lease period, wherein the new requested lease period includes a time factor associated with a transmission time for the second dirty call to be received by the second platform; and sending a second return call to the first platform including a second granted lease period during which additional access to the resource is permitted by the first platform.

18. The computer-readable medium of claim 17, wherein sending the first return call includes:

incrementing a count corresponding to the resource.

19. The computer-readable medium of claim 18, wherein the method further includes:

collecting the resource when the second platform determines that the granted lease period for the resource has expired or the count corresponding to the resource indicates that access to the resource is no longer requested.

20. The computer-readable medium of claim 18, wherein the method further includes:

receiving a notification from the first platform indicating that access to the resource is no longer needed; and decrementing the count corresponding to the resource.

21. A method for managing objects in a distributed system, comprising:

receiving a response to a request for a lease to a reference to an object located on a remote platform for a requested lease period;

holding the lease;

determining when the lease is about to expire based on a granted lease period corresponding to the requested lease period; and sending a request to renew the lease based on the determination.

22. The method of claim 21, further comprising:

receiving a renewed lease to the reference with an associated renewed lease period.

23. The method of claim 21, wherein prior to holding the lease, the method further includes:

receiving an indication of a grant of the lease for the granted lease period.

24. The method of claim 21, wherein the determining and sending steps are repeated until the object is no longer needed.

25. A method for managing objects in a distributed system including a first entity and a second entity, the method performed by the first entity, comprising:

holding a lease to a reference to an object, wherein associated with the lease is a requested lease period designated by the first entity, and wherein the lease was granted by the second entity for a granted lease period corresponding to the requested lease period;

determining when the lease is about to expire based on the lease period; and sending a request to the second entity to renew the lease based on the determination.

26. The method of claim 25, wherein the determining and sending steps are repeated until the object is no longer needed.

27. A method for managing resources, comprising:

holding a lease associated with an object, and receiving a response to a request to renew the lease for a requested renewed lease period shortly before the lease is to expire based on a determination that a need exists to continue to have access to the object.

28. A method for managing resources, comprising:

holding a lease to a reference to an object, wherein associated with the lease is a lease period;

determining when the object is no longer needed; and sending an indication that the object is no longer needed, based on the determination.

29. The method of claim 28, wherein the lease is revoked and resources corresponding to the object are reclaimed by a process that manages the object in response to the indication being sent.

30. A method for managing objects in a system including a first process and a second process, wherein the second process manages references to objects, the method performed by the first process, comprising:

holding a lease to a reference to a first object, wherein associated with the lease is a lease period;

determining when the first object is no longer needed; and sending an indication to the second process that the object is no longer needed, based on the determination.

31. A method for managing resources, comprising:

granting a lease for a lease period to a resource in response to a request for the lease, wherein the lease period is determined based on a requested lease period included in the request for the lease;

receiving a request to renew the lease before the lease period expires; and granting the request for a new lease period.

32. A method for managing resources, comprising:

granting a lease to a reference to a resource in response to a request for the lease, wherein the lease is associated with a lease period;

receiving an indication that the resource is no longer needed; and reclaiming the resource in response to the indication.

33. A computer-readable medium including instructions for performing a method, when executed by a processor, for managing objects in a distributed system, the method comprising:

receiving a response to a request for a lease to a reference to an object located on a remote platform for a requested lease period;

holding the lease;

determining when the lease is about to expire based on a granted lease period corresponding to the requested lease period; and sending a request to renew the lease based on the determination.

34. The computer-readable medium of claim 33, further comprising:

receiving a renewed lease to the reference with an associated renew lease period.

35. The computer-readable medium of claim 33, wherein prior to holding the lease, the method further includes:

receiving an indication of a grant of the lease for the granted lease period.

36. The computer-readable medium of claim 33, wherein the determining and sending steps are repeated until the resource is no longer needed.

37. A computer-readable medium including instructions for performing a method, when executed by a processor, for managing objects in a distributed system including a first entity and a second entity, the method performed by the first entity, comprising:

holding a lease to a reference to an object, wherein associated with the lease is a requested lease period designated by the first entity, and wherein the lease was granted by the second entity for a granted lease period corresponding to the requested lease period;

determining when the lease is about to expire based on the lease period; and sending a request to the second entity to renew the lease based on the determination.

38. The computer-readable medium of claim 37, wherein the determining and sending steps are repeated until the object is no longer needed.

39. A computer-readable medium including instructions for performing a method, when executed by a processor, for managing resources, the method comprising:

holding a lease associated with an object, and receiving a response to a request to renew the lease for a requested renewed lease period shortly before the lease is to expire based on a determination that a need exists to continue to have access to the object.

40. A computer-readable medium including instructions for performing a method, when executed by a processor, for managing resources, comprising:

holding a lease to a reference to an object, wherein associated with the lease is a lease period;

determining when the object is no longer needed; and sending an indication that the object is no longer needed, based on the determination.

41. The computer-readable medium of claim 40, wherein the lease is revoked and resources corresponding to the object are reclaimed by a process that manages the object in response to the indication being sent.

42. A computer-readable medium including instructions for performing a method, when executed by a processor, for managing objects in a distributed system including a first process and a second process, wherein the second process manages references to objects, the method performed by the first process, comprising:

holding a lease to a reference to a first object, wherein associated with the lease is a lease period;

determining when the first object is no longer needed; and sending an indication to the second process that the object is no longer needed, based on the determination.

43. A computer-readable medium including instructions for performing a method, when executed by a processor, for managing resources, the method comprising:

granting a lease for a lease period to a resource in response to a request for the lease, wherein the lease period is determined based on a requested lease period included in the request for the lease;

receiving a request to renew the lease before the lease period expires; and granting the request for a new lease period.

44. A computer-readable medium including instructions for performing a method, when executed by a processor, for managing resources, the method comprising:

granting a lease to a reference to a resource in response to a request for the lease, wherein the lease is associated with a lease period;

receiving an indication that the resource is no longer needed; and reclaiming the resource in response to the indication.

45. A system for managing objects distributed among a plurality of platforms within a distributed processing system, the system comprising:

means for sending, from a first platform to a second platform remotely located from the first platform, a first request to access an object managed by the second platform, wherein the request indicates a period of time the first platform requests access to the object;

means for sending, from the second platform to the first platform, a lease indicating a period of time for which access to the object is permitted by the first platform; and means for sending, by the first platform to the second platform, a second request to renew the lease, wherein the second request includes an indication of an additional period of time the first platform requests access to the object and wherein the additional period of time includes a time factor associated with a transmission time for the second request to be received by the second platform.

46. The system of claim 45, wherein the means for sending the lease from the second platform to the first platform includes:

means for incrementing a count corresponding to the object.

47. The system of claim 46, further including:

means for collecting resources corresponding to the object when the second platform determines that the access period for the object indicated in the lease has expired or the count corresponding to the object indicates that access to the object is no longer requested.

48. The system of claim 46, further including:

means for sending, from the first platform to the second platform, a notification indicating that access to the object is no longer needed; and means for decrementing, by the second platform, the count corresponding to the object.

49. A system for managing resources distributed among a plurality of platforms within a distributed processing system, including a first and second platform, the first platform comprising:

means for sending to the second platform a first dirty call associated with a resource managed by the second platform and including a requested lease period;

means for receiving a return call including a granted lease period during which access to the resource is permitted by the first platform;

means for determining a transmission time for the dirty call to be received by the second platform;

means for determining that the lease period is about to expire;

means for generating a second dirty call associated with the resource managed by the second platform and including a new requested lease period, wherein the new requested lease period includes a time factor associated with the transmission time; and means for sending the second dirty call to the second platform.

50. The system of claim 49, wherein the first platform further includes:

means for determining that access to the resource is no longer needed; and means for sending to the second platform a notification indicating that access to the resource managed by the second platform is no longer needed.

51. A system for managing resources within a distributed processing system including a first platform and a second platform, the second platform comprising:

means for receiving a first dirty call from the first platform associated with a resource managed by the second platform and including a requested lease period;

means for sending a first return call to the first platform including a granted lease period during which access to the resource is permitted by the first platform;

means for receiving a second dirty call from the first platform associated with the resource managed by the second platform and including a new requested lease period, wherein the new requested lease period includes a time factor associated with a transmission time for the second dirty call to be received by the second platform; and means for sending a second return call to the first platform including a second granted lease period during which additional access to the resource is permitted by the first platform.

52. The system of claim 51, wherein the means for sending the first return call includes:

means for incrementing a count corresponding to the resource.

53. The system of claim 52, wherein the second platform further includes:

means for collecting the resource when the second platform determines that the granted lease period for the resource has expired or the count corresponding to the resource indicates that access to the resource is no longer requested.

54. The system of claim 52, further including:

receiving a notification from the first platform indicating that access to the resource is no longer needed; and decrementing the count corresponding to the resource.

55. A system for managing objects in a distributed system, comprising:

means for receiving a response to a request for a lease to a reference to an object located on a remote platform for a requested lease period;

means for holding the lease;

means for determining when the lease is about to expire based on a granted lease period corresponding to the requested lease period; and means for sending a request to renew the lease based on the determination.

56. The system of claim 55, further comprising:

means for receiving a renewed lease to the reference with an associated renewed lease period.

57. The system of claim 55, wherein the means for holding the lease further includes:

means for receiving an indication of a grant of the lease for the granted lease period.

58. A system for managing objects in a distributed system including a first entity and a second entity, the first entity comprising:
- means for holding a lease to a reference to an object, wherein associated with the lease is a requested lease period designated by the first entity, and wherein the lease was granted by the second entity for a granted lease period corresponding to the requested lease period;
- means for determining when the lease is about to expire based on the lease period; and
- means for sending a request to the second entity to renew the lease based on the determination.

59. A system for managing resources, comprising:
- means for holding a lease associated with an object, and
- means for receiving a response to a request to renew the lease for a requested renewed lease period shortly before the lease is to expire based on a determination that a need exists to continue to have access to the object.

60. A system for managing resources, comprising:
- means for holding a lease to a reference to an object, wherein associated with the lease is a lease period;
- means for determining when the object is no longer needed; and
- means for sending an indication that the object is no longer needed, based on the determination.

61. The system of claim 60, wherein the lease is revoked and resources corresponding to the object are reclaimed by a process that manages the object in response to the indication being sent.

62. A system for managing objects in a system including a first process and a second process, wherein the second process manages references to objects, the first process comprising:
- means for holding a lease to a reference to a first object, wherein associated with the lease is a lease period;
- means for determining when the first object is no longer needed; and
- means for sending an indication to the second process that the object is no longer needed, based on the determination.

63. A system for managing resources, comprising:
- means for granting a lease for a lease period to a resource in response to a request for the lease, wherein the lease period is determined based on a requested lease period included in the request for the lease;
- means for receiving a request to renew the lease before the lease period expires, and
- means for granting the request for a new lease period.

64. A system for managing resources, comprising:
- means for granting a lease to a reference to a resource in response to a request for the lease, wherein the lease is associated with a lease period;
- means for receiving an indication that the resource is no longer needed; and
- means for reclaiming the resource in response to the indication.

65. A memory for storing data for access by a process being executed by a processor, the memory comprising:
- a structure for maintaining (i) a reference count corresponding to a resource and reflecting a number of processes having references to the resource, and (ii) a time interval during which it is guaranteed that the resource will be accessible for at least one process, wherein a reclamation process may reclaim the resource after the time interval.

66. The memory of claim 65, wherein a renew process extends the time interval during which the resource is accessible.

67. A memory for storing data for access by a process being executed by a processor, the memory comprising:
- a structure for maintaining (i) a reference count corresponding to an object and reflecting a number of other objects having references to the object, and (ii) a time interval during which it is guaranteed that the object will be accessible for at least one of the other objects, wherein a reclamation process determines to reclaim the object upon expiration of the time interval regardless of the number of other objects having references to the object reflected by the reference count.

68. A memory for storing data for access by a process being executed by a processor, the memory comprising:
- a structure for maintaining a time interval during which it is guaranteed that an object will be accessible for at least one process, wherein a reclamation process determines to reclaim the object upon expiration of the time interval regardless of whether any other processes maintain references to the object.

69. A memory for storing data for access by a process being executed by a processor, the memory comprising:
- a structure for maintaining a time interval during which it is guaranteed that an object will be accessible to at least one other object, wherein a reclamation process determines to reclaim the object based on expiration of the time interval regardless of whether any other objects maintain references to the object.

70. The memory of any one of claims 67–69, wherein a renew process extends the time interval during which the object is accessible.

71. A memory for storing data for access by a process being executed by a processor, the memory comprising:
- a structure for maintaining a time interval during which it is guaranteed that a first object will be accessible for at least one other object, wherein a reclamation process determines to reclaim the first object upon expiration of the time interval regardless of whether a reference count corresponding to the first object indicates that the at least one other object has a reference to the object.

72. A memory for storing data for access by a process being executed by a processor, the memory comprising:
- a structure for maintaining a time interval during which it is guaranteed that a first object will be accessible for at least one other process, wherein a reclamation process determines to reclaim the first object upon expiration of the time interval regardless of whether a reference count corresponding to the first object indicates that other processes hold references to the object.

73. The memory of any one of claims 71 and 72, wherein a renew process extends the time interval during which the first object is accessible.

74. A method for managing objects performed by at least one processor comprising:
- sending a request to access an object;
- receiving a response to the request indicating a period of time for which access to the object on a nonexclusive basis is permitted;
- determining whether the period for which access to the object has been permitted is about to expire; and
- providing a notification that the period for which access to the object has been permitted is about to expire.

75. The method of claim 74, further comprising:
renewing the request to access the object based upon a determination that access to the object is required.

76. The method of claim 74, wherein the receiving step includes:
incrementing a counter corresponding to the object reflecting the response.

77. The method of claim 74, further comprising:
sending a notification indicating that access to the object is no longer required.

78. The method of claim 77, wherein sending a notification indicating that access to the object is no longer required, includes:
decrementing a counter corresponding to the object reflecting the notification.

79. The method of claim 78, wherein decrementing a counter corresponding to the object reflecting the notification, includes:
invoking a process to collect resources corresponding to the object upon a determination that the counter corresponding to the object indicates that access to this object is no longer required.

80. The method of any one of claims 74 to 79, wherein the request includes a reference corresponding to the object and indicating a period of time for which access to the object is requested.

81. A method for managing objects performed by at least one processor comprising:
receiving a response to a request to access an object, wherein access to the object is permitted for a time interval associated with the object;
determining whether the period for which access to the object has been permitted is about to expire; and
providing a notification that the period for which access to the object has been permitted is about to expire.

82. A method for managing objects performed by at least one processor comprising:
receiving a response to a request to access an object, wherein access to the object on a nonexclusive basis is permitted for a time interval associated with the object;
determining whether the period for which access to the object has been permitted is about to expire; and
providing a notification that the period for which access to the object has been permitted is about to expire.

83. A method for managing objects comprising the steps, performed by at least one processor, of:
receiving a request for access to an object for a requested lease period; and
permitting access to the object for a granted lease period determined based on the requested lease period.

84. The method of claim 83, wherein the request includes an application for a lease to the object.

85. The method of claim 83, further including:
releasing any resources associated with the object when or after the lease period expires.

86. The method of claim 83, wherein the request includes a reference to the object.

87. The method of claim 83, further including:
sending a response to the request.

88. The method of claim 87, wherein the response includes a reference to the object.

89. The method of claim 87, wherein the response includes an indication of the lease period.

90. The method of any one of claims 83 to 88, wherein access to the object is permitted on a nonexclusive basis for the lease period.

91. The method of any one of claims 83 to 88, further including:
providing a notification that the time interval is about to expire.

92. The method of claim 83, further including:
receiving a request for lease renewal.

93. A method for managing objects performed by at least one processor comprising:
receiving a response to a request for access to an object for a requested lease period, wherein access to the object is permitted for a granted lease period determined based on the requested lease period; and
sending a request for renewed access to the object.

94. The method of claim 93, wherein sending includes:
determining whether the lease period for which access to the object has been permitted is about to expire.

95. A system for managing objects, comprising:
means for sending a request to access an object;
means for receiving a response to the request indicating a period of time for which access to the object on a nonexclusive basis is permitted;
means for determining whether the period for which access to the object has been permitted is about to expire; and
means for providing a notification that the period for which access to the object has been permitted is about to expire.

96. The system of claim 95, further comprising:
means for renewing the request to access the object based upon a determination that access to the object is required.

97. The system of claim 95, wherein the means for receiving includes:
means for incrementing a counter corresponding to the object reflecting the response.

98. The system of claim 95, further comprising:
means for sending a notification indicating that access to the object is no longer required.

99. The system of claim 98, wherein the means for sending a notification indicating that access to the object is no longer required, includes:
means for decrementing a counter corresponding to the object reflecting the notification.

100. The system of claim 99, wherein the means for decrementing a counter corresponding to the object reflecting the notification, includes:
means for invoking a process to collect resources corresponding to the object upon a determination that the counter corresponding to the object indicates that access to this object is no longer required.

101. The system of any one of claims 95 to 100, wherein the request includes a reference corresponding to the object and indicating a period of time for which access to the object is requested.

102. A system for managing objects, comprising:
means for receiving a response to a request to access an object, wherein access to the object is permitted for a time interval associated with the object;
means for determining whether the period for which access to the object has been permitted is about to expire; and
means for providing a notification that the period for which access to the object has been permitted is about to expire.

103. A system for managing objects, comprising:

means for receiving a response to a request to access an object, wherein access to the object on a nonexclusive basis is permitted for a time interval associated with the object;

means for determining whether the period for which access to the object has been permitted is about to expire; and means for providing a notification that the period for which access to the object has been permitted is about to expire.

104. A system for managing objects, comprising:

means for receiving a request for access to an object for a requested lease period; and means for permitting access to the object for a granted lease period determined based on the requested lease period.

105. The system of claim 104, wherein the request includes an application for a lease to the object.

106. The system of claim 104, further including:

means for releasing any resources associated with the object when or after the lease period expires.

107. The system of claim 104, wherein the request includes a reference to the object.

108. The system of claim 104, further including:

means for sending a response to the request.

109. The system of claim 108, wherein the response includes a reference to the object.

110. The system of claim 108, wherein the response includes an indication of the lease period.

111. The system of anyone of claims 104 to 110, wherein access to the object is permitted on a nonexclusive basis for the lease period.

112. The system of any one of claims 104 to 110, further including:

means for providing a notification that the time interval is about to expire.

113. The system of claim 104, further including:

means for receiving a request for lease renewal.

114. A system for managing objects, comprising:

means for receiving a response to a request for access to an object for a requested lease period, wherein access to the object is permitted for a granted lease period determined based on the requested lease period; and means for sending a request for renewed access to the object.

115. The system of claim 114, wherein the means for sending includes:

means for determining whether the lease period for which access to the object has been permitted is about to expire.

116. A computer-readable medium including instructions for performing a method, when executed by at least one processor, for managing objects, the method comprising:

sending a request to access an object;

receiving a response to the request indicating a period of time for which access to the object on a nonexclusive basis is permitted;

determining whether the period for which access to the object has been permitted is about to expire; and providing a notification that the period for which access to the object has been permitted is about to expire.

117. The computer-readable medium of claim 116, the method further comprising:

renewing the request to access the object based upon a determination that access to the object is required.

118. The computer-readable medium of claim 116, wherein the receiving step includes:

incrementing a counter corresponding to the object reflecting the response.

119. The computer-readable medium of claim 116, the method further comprising:

sending a notification indicating that access to the object is no longer required.

120. The computer-readable medium of claim 119, wherein sending a notification indicating that access to the object is no longer required, includes:

decrementing a counter corresponding to the object reflecting the notification.

121. The computer-readable medium of claim 120, wherein decrementing a counter corresponding to the object reflecting the notification, includes:

invoking a process to collect resources corresponding to the object upon a determination that the counter corresponding to the object indicates that access to this object is no longer required.

122. The computer-readable medium of any one of claims 116 to 121, wherein the request includes a reference corresponding to the object and indicating a period of time for which access to the object is requested.

123. A computer-readable medium including instructions for performing a method, when executed by at least one processor, for managing objects, the method comprising:

receiving a response to a request to access an object, wherein access to the object is permitted for a time interval associated with the object;

determining whether the period for which access to the object has been permitted is about to expire; and providing a notification that the period for which access to the object has been permitted is about to expire.

124. A computer-readable medium including instructions for performing a method, when executed by at least one processor, for managing objects, the method comprising:

receiving a response to a request to access an object, wherein access to the object on a nonexclusive basis is permitted for a time interval associated with the object;

determining whether the period for which access to the object has been permitted is about to expire; and providing a notification that the period for which access to the object has been permitted is about to expire.

125. A computer-readable medium including instructions for performing a method, when executed by at least one processor, for managing objects, the method comprising:

receiving a request for access to an object for a requested lease period; and permitting access to the object for a granted lease period determined based on the requested lease period.

126. The computer-readable medium of claim 125, wherein the request includes an application for a lease to the object.

127. The computer-readable medium of claim 125, the method further including:

releasing any resources associated with the object when or after the lease period expires.

128. The computer-readable medium of claim 125, wherein the request includes a reference to the object.

129. The computer-readable medium of claim 125, the method further including:

sending a response to the request.

130. The computer-readable medium of claim 129, wherein the response includes a reference to the object.

131. The computer-readable medium of claim 129, wherein the response includes an indication of the lease period.

132. The computer-readable medium of any one of claims 125 to 131, wherein access to the object is permitted on a nonexclusive basis for the lease period.

133. The computer-readable medium of any one of claims 125 to 131, the method further including:

providing a notification that the time interval is about to expire.

134. The computer-readable medium of claim 125, the method further including:

receiving a request for lease renewal.

135. A computer-readable medium including instructions for performing a method, when executed by at least one processor, for managing objects, the method comprising:

receiving a response to a request for access to an object for a requested lease period, wherein access to the object is permitted for a granted lease period determined based on the requested lease period; and sending a request for renewed access to the object.

136. The computer-readable medium of claim 135, wherein sending includes:

determining whether the lease period for which access to the object has been permitted is about to expire.

137. An apparatus for managing objects, comprising:

a component configured to send a request to access an object, receive a response to the request indicating a period of time for which access to the object on a nonexclusive basis is permitted, determine whether the period for which access to the object has been permitted is about to expire, and provide a notification that the period for which access to the object has been permitted is about to expire; and a component configured to provide the response based on the request to access an object.

138. An apparatus for managing objects, comprising:

a module configured to receive a response to a request to access an object, wherein access to the object is permitted for a time interval associated with the object;

a module configured to determine whether the period for which access to the object has been permitted is about to expire; and a module configured to provide a notification that the period for which access to the object has been permitted is about to expire.

139. An apparatus for managing objects, comprising:

a memory that contains at least one set of program instructions that receive a response to a request to access an object, wherein access to the object on a nonexclusive basis is permitted for a time interval associated with the object, determine whether the period for which access to the object has been permitted is about to expire, and provide a notification that the period for which access to the object has been permitted is about to expire; and a processor that executes the at least one set of program instructions.

140. An apparatus for managing objects, comprising:

a processing module that receives a request for access to an object for a requested lease period; and a processing module that permits access to the object for a granted lease period determined based on the requested lease period.

141. The apparatus of claim 140, wherein the request includes an application for a lease to the object.

142. The apparatus of claim 140, further including:

a processing module that releases any resources associated with the object when or after the lease period expires.

143. The apparatus of claim 140, wherein the request includes a reference to the object.

144. The apparatus of claim 140, further including:

a processing module that sends a response to the request.

145. The apparatus of claim 144, wherein the response includes a reference to the object.

146. The apparatus of claim 144, wherein the response includes an indication of the lease period.

147. The apparatus of any one of claims 140 to 146, wherein access to the object is permitted on a nonexclusive basis for the lease period.

148. The apparatus of any one of claims 140 to 146, further including:

a processing module that provides a notification that the time interval is about to expire.

149. The apparatus of claim 140, further including:

a processing module that receives a request for lease renewal.

* * * * *

UNITED STATES PATENT AND TRADEMARK OFFICE
CERTIFICATE OF CORRECTION

PATENT NO. : 6,704,756 B2
DATED : March 9, 2004
INVENTOR(S) : Ann M. Wollrath et al.

It is certified that error appears in the above-identified patent and that said Letters Patent is hereby corrected as shown below:

<u>Column 19,</u>
Line 51, "expires," should read -- expires; --.

<u>Column 23,</u>
Line 32, "anyone" should read -- any one --.

Signed and Sealed this

Twenty-fifth Day of May, 2004

JON W. DUDAS
*Acting Director of the United States Patent and Trademark Office*